United States Patent
Sumi et al.

(10) Patent No.: US 7,449,036 B2
(45) Date of Patent: Nov. 11, 2008

(54) FUEL GAS MANUFACTURING APPARATUS AND METHOD OF OPERATING SAME

(75) Inventors: Hideaki Sumi, Utsunomiya (JP); Satoshi Hanai, Haga-gun (JP); Hikaru Okada, Asaka (JP)

(73) Assignees: Honda Motor Co., Ltd., Tokyo (JP); Sumitomo Seika Chemicals Co., Ltd., Kako-gun (JP)

( * ) Notice: Subject to any disclaimer, the term of this patent is extended or adjusted under 35 U.S.C. 154(b) by 562 days.

(21) Appl. No.: 11/067,174

(22) Filed: Feb. 24, 2005

(65) Prior Publication Data
US 2005/0183336 A1 Aug. 25, 2005

(30) Foreign Application Priority Data
Feb. 24, 2004 (JP) ............ 2004-047974

(51) Int. Cl.
B01J 7/00 (2006.01)
C01B 3/24 (2006.01)
(52) U.S. Cl. ..................... 48/61; 48/197 R
(58) Field of Classification Search ........ 48/61, 48/197 R
See application file for complete search history.

(56) References Cited

U.S. PATENT DOCUMENTS 7,166,139 B2 * 1/2007 Wunning .......... 48/214 R
7,238,215 B2 * 7/2007 Gauthier et al. ...... 48/198.3
2003/0208960 A1 * 11/2003 Narasimhan et al. .... 48/198.3
2004/0068932 A1 * 4/2004 Stewart ............. 48/127.9
2004/0179998 A1 * 9/2004 Gittleman et al. ...... 423/650

FOREIGN PATENT DOCUMENTS

| JP | 2001-010806 | | 1/2001 |
| JP | 2002-20102 | * | 1/2002 |
| JP | 2004-299994 | | 10/2004 |

OTHER PUBLICATIONS

Japanese Office Action for Application No. 2004-047974, dated Jul. 10, 2007.

* cited by examiner

*Primary Examiner*—Wayne Langel
(74) *Attorney, Agent, or Firm*—Lahive & Cockfield, LLP; Anthony A. Laurentano, Esq.

(57) ABSTRACT

A residual gas supply means includes a residual gas passage connected to a PSA mechanism and a heater, and a branch passage having opposite ends connected to the residual gas passage and branched from the residual gas passage. The residual gas passage has an opening-adjustable valve having an adjustable opening positioned between the connected opposite ends of the branch passage. The branch passage has a check valve, a chamber for storing the residual gas, and an on-off valve.

10 Claims, 8 Drawing Sheets

FUEL GAS MANUFACTURING APPARATUS AND METHOD OF OPERATING SAME

BACKGROUND OF THE INVENTION

1. Field of the Invention

The present invention relates to a fuel gas manufacturing apparatus for manufacturing a hydrogen-rich fuel gas by modifying a hydrogen-containing fuel which contains hydrocarbon or alcohol, and a method of operating such a fuel gas manufacturing apparatus.

2. Description of the Related Art

There has been employed in the art a hydrogen manufacturing apparatus (fuel gas manufacturing apparatus) for modifying a hydrocarbon fuel such as natural gas or the like or a hydrogen-containing fuel containing alcohol such as methanol or the like to produce a hydrogen-containing gas (modified gas) and supplying the hydrogen-containing gas as a fuel gas to a fuel cell or the like.

Such a hydrogen manufacturing apparatus basically operates to modify a hydrocarbon fuel such as a natural gas, a city gas, or the like with water vapor to produce a hydrogen-containing gas as a high-concentration hydrogen-rich gas, and separate high-purity hydrogen from the hydrogen-containing gas with a PSA (Pressure Swing Adsorption) device according to pressure adsorption.

Specifically, a hydrogen-containing gas produced by modifying a hydrocarbon fuel with water vapor contains various unwanted materials including $CO$, $CO_2$, $H_2O$, $CH_4$, etc. in addition to a hydrogen gas as a major component. The PSA device has three adsorption towers, for example, each cyclically operable in adsorption, depressurization, pressure uniformization, blowing-down, and purging processes for extracting high-purity hydrogen and discharging the other components or unwanted materials as an off gas.

The off gas discharged from the PSA device is usually temporarily stored in an off-gas tank and supplied therefrom as a combusting fuel to a burner (heater) of a hydrogen-manufacturing modifier. Since the off-gas tank is intermittently supplied with the off gas from each of the adsorption towers, the off-gas tank is subject to pressure fluctuations. Such pressure fluctuations in the off-gas tank adversely affect the operation of the modifier and the PSA device, and tend to change the combustion state in the burner. Therefore, the pressure fluctuations in the off-gas tank need to be reduced.

Figure 8:
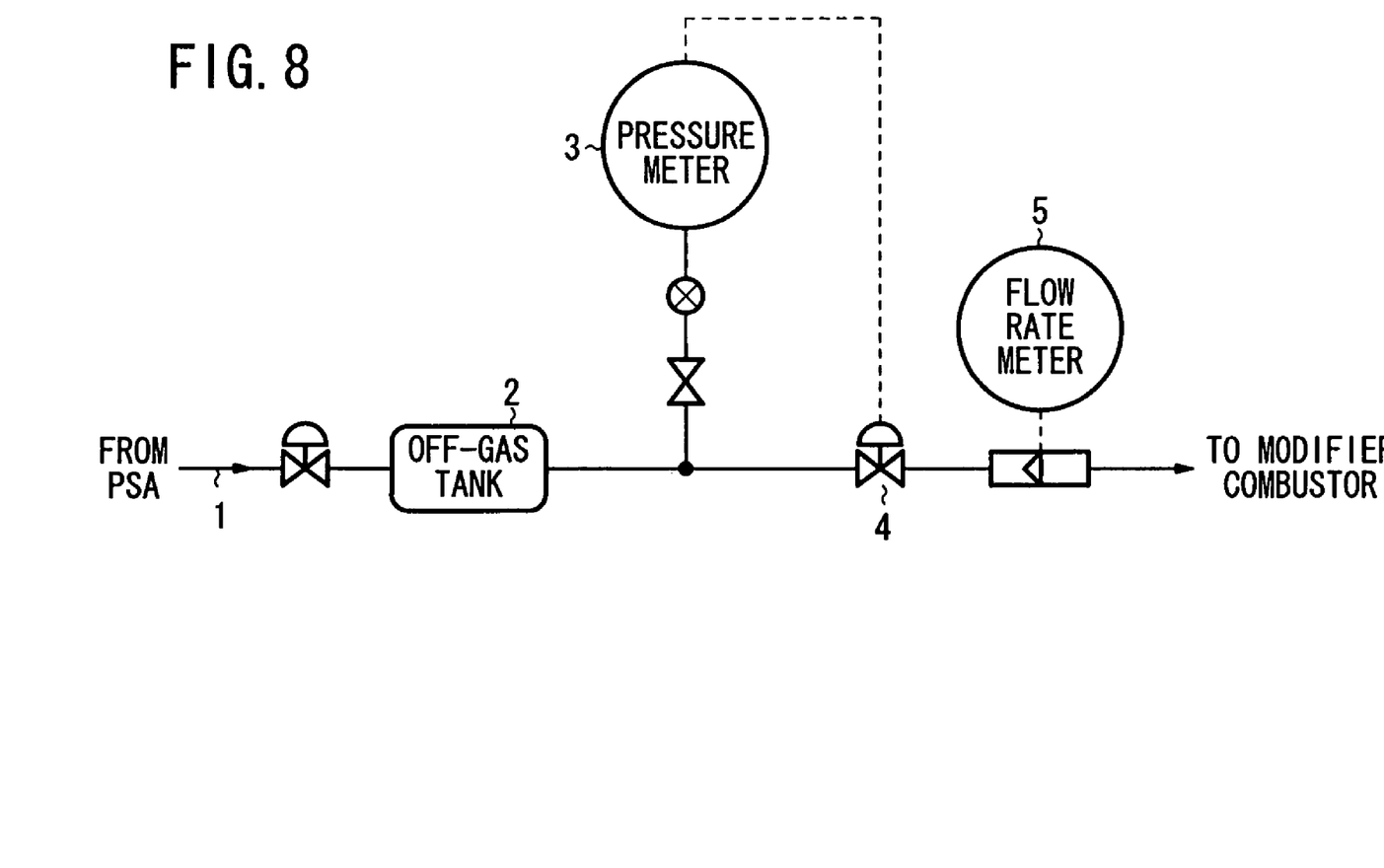
FIG. 8 is a block diagram of a system for carrying out the method of controlling the pressure of an off gas as disclosed in Japanese Laid-Open Patent Publication No. 2001-10806.

There is known in the art a method of controlling the pressure of an off gas as disclosed in Japanese Laid-Open Patent Publication No. 2001-10806, for example. According to the known method, as shown in FIG. 8 of the accompanying drawings, an off-gas tank 2 is connected to an off-gas passage 1 extending from a PSA device to a modifier combustor. The off-gas tank 2 has an outlet conduit connected to a pressure meter 3. An off-gas flow rate adjusting valve 4 is connected to the outlet conduit of the off-gas tank 2 downstream of the pressure meter 3. The opening of the off-gas flow rate adjusting valve 4 is variable depending on the actual pressure of the off gas measured by the pressure meter 3. A flow rate meter 5 is connected to the outlet conduit of the off-gas tank 2 downstream of the off-gas flow rate adjusting valve 4.

Using the minimum pressure in the off-gas tank 2 as a reference, the opening of the off-gas flow rate adjusting valve 4 is varied at small intervals up to its full opening level for reducing pressure fluctuations of the off gas from the off-gas tank 2 to stably supply the off gas to the burner of the modifier combustor.

However, the off-gas tank 2 is required to be of such a size several times greater than the PSA device for effectively performing its function, and hence the hydrogen manufacturing apparatus is of a considerably large size. In particular, the hydrogen manufacturing apparatus with the off-gas tank 2 cannot be used as a hydrogen manufacturing apparatus for household use because an installation space available therefor in household applications is usually small.

SUMMARY OF THE INVENTION

It is a principal object of the present invention to provide a fuel gas manufacturing apparatus which requires no off-gas tank and is of a simple arrangement capable of reliably controlling the flow rate of an off gas supplied to a heater.

According to the present invention, there is provided an apparatus for manufacturing a fuel gas, comprising a modifier for modifying a hydrogen-containing fuel to produce a modified gas, a refiner including a PSA mechanism for removing unwanted materials from the modified gas to refine a hydrogen-rich fuel gas, and residual gas supply means for supplying a residual gas from a tower of the PSA mechanism to a heater. There is also provided a method of operating such an apparatus. The hydrogen-containing fuel refers to a fuel containing hydrogen, such as hydrocarbon, alcohol, or the like.

The residual gas supply means includes a residual gas passage connected to the PSA mechanism and the heater, and a branch passage having opposite ends connected to the residual gas passage and branched from the residual gas passage. The residual gas passage has a flow rate adjusting mechanism positioned between the connected opposite ends of the branch passage, and the branch passage has a chamber for storing the residual gas and a valve, the chamber and the valve being successively arranged along a direction in which the residual gas flows through the branch passage.

When the residual gas is discharged from the PSA mechanism, i.e., when a cleaning process or a desorption process of the PSA mechanism begins, the valve is closed to trap part of the residual gas in the chamber. Therefore, the calorific amount of the residual gas charged into the heater is prevented from becoming greater than necessary. When the residual gas is not discharged from the PSA mechanism, the valve is opened to supply the stored residual gas from the chamber to the heater. The calorific amount of the residual gas supplied to the heater is prevented from being unduly lowered, avoiding an unnecessary reduction in the temperature of the heater.

According to the present invention, part of the residual gas discharged from the PSA mechanism is stored in the chamber, and when the residual gas is not discharged from the PSA mechanism, the residual gas stored in the chamber is supplied to the heater. Consequently, the heater is able to maintain a predetermined amount of heat at all times. The apparatus for manufacturing a fuel gas is of a simple arrangement free of an off-gas tank and is of a small size, and reduces a thermal load on the heater.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
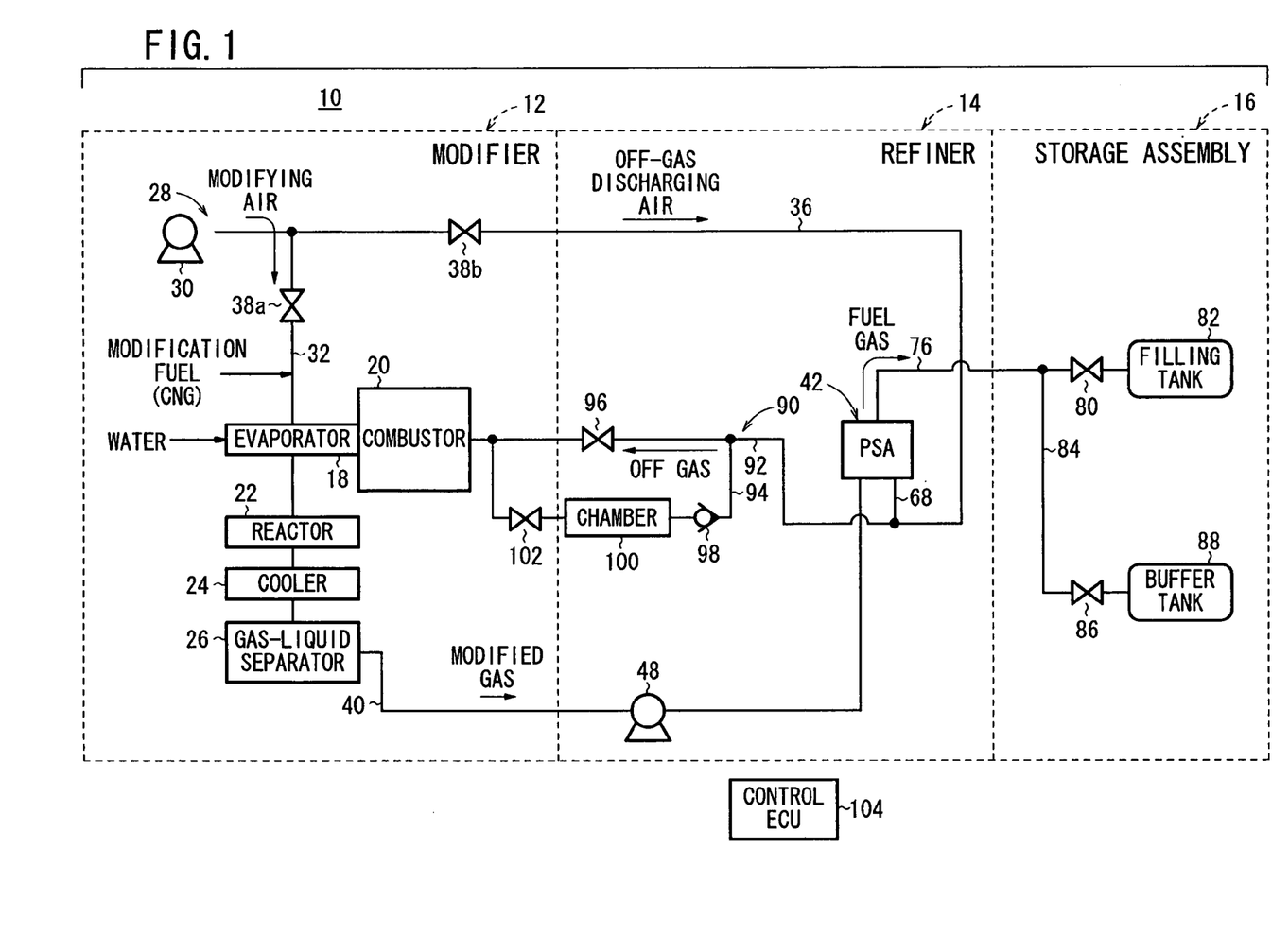
FIG. 1 is a block diagram of a home fuel gas refining system as a fuel gas manufacturing apparatus according to a first embodiment of the present invention.

FIG. 1 shows in block form a home fuel gas refining system (fuel gas refining system for household use) 10 as a fuel gas manufacturing apparatus according to a first embodiment of the present invention.

As shown in FIG. 1, the home fuel gas refining system 10 has a modifier 12 for modifying a hydrogen-containing fuel, e.g., a hydrocarbon fuel such as methane, propane, or the like (hereinafter referred to as "modification fuel") to produce a hydrogen-rich gas (hereinafter referred to as "modified gas"), a refiner 14 for refining the hydrogen-rich gas into a high-purity hydrogen gas (hereinafter referred to as "fuel gas"), and a storage assembly 16 for storing the fuel gas.

The modifier 12 has an evaporator 18 for evaporating the modification fuel. The evaporator 18 is combined with a combustor (heater) 20. A reactor 22 for modifying the modification fuel into the modified gas is disposed downstream of the evaporator 18. A cooler 24 for cooling the modified gas is disposed downstream of the reactor 22. A gas-liquid separator 26 for separating the cooled modified gas into a gaseous component and a water component is disposed downstream of the cooler 24.

The modifier 12 includes an air supply mechanism 28 having an air compressor (compressed-air supply source) 30 which is connected to a modifying-air supply passage 32 and an off-gas discharging air supply passage 36. The modifying-air supply passage 32 is connected to the evaporator 18. The off-gas discharging air supply passage 36 is connected to the combustor 20 through a PSA mechanism 42 described later. The modifying-air supply passage 32 and the off-gas discharging air supply passage 36 can be connected to the air compressor 30 respectively through valves 38a, 38b.

A PSA mechanism 42 of the refiner 14 is disposed downstream of and connected to the gas-liquid separator 26 through a modified gas supply passage 40. The PSA mechanism 42 is supplied with a modified gas from which water is separated by the gas-liquid separator 26. A compressor 48 is connected to the modified gas supply passage 40 for delivering the modified gas under pressure to the PSA mechanism 42.

Figure 2:
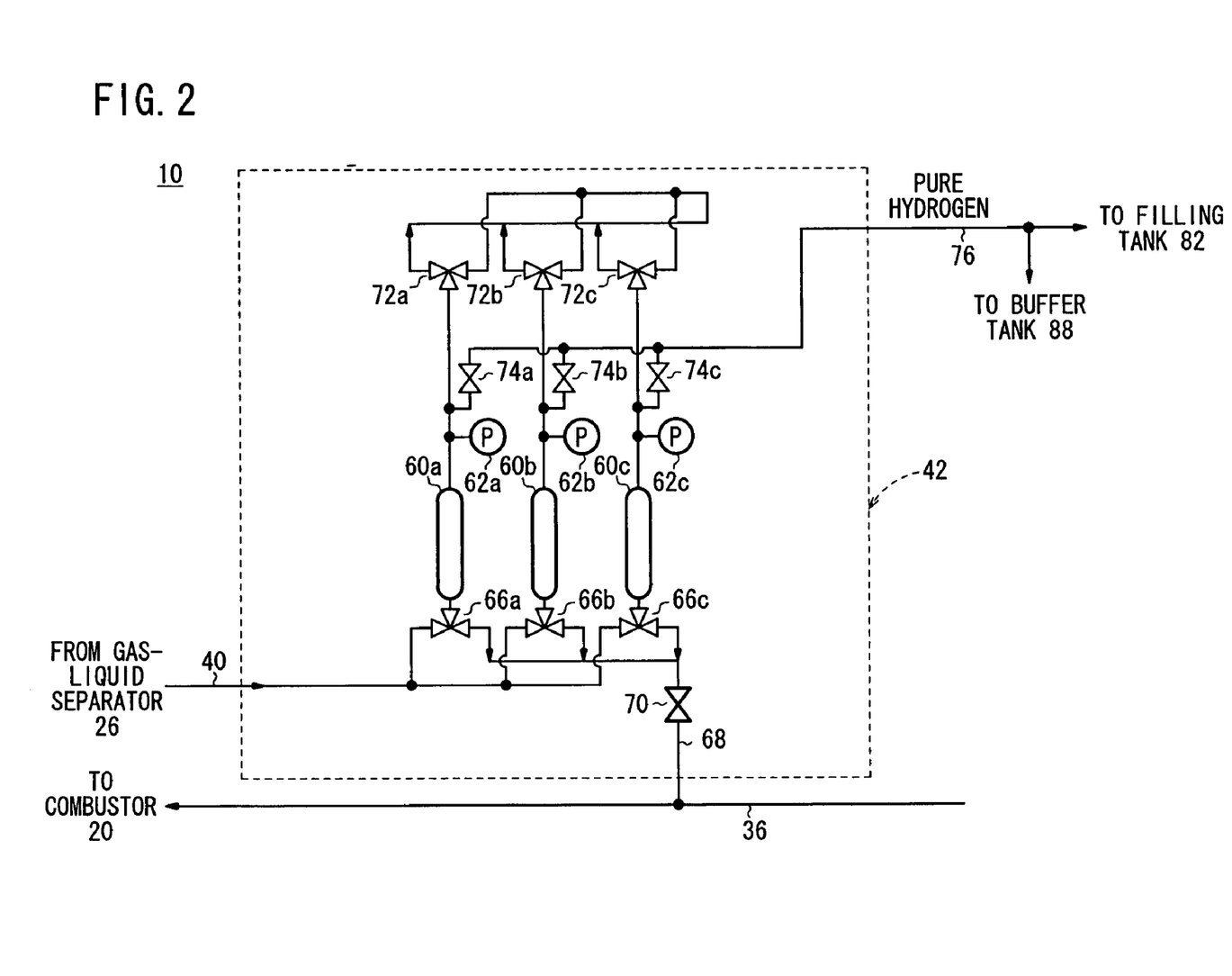
FIG. 2 is a block diagram of a PSA mechanism in the home fuel gas refining system shown in FIG. 1.

As shown in FIG. 2, the PSA mechanism 42 comprises a three-tower swing adsorption device, for example, and has three adsorption towers 60a, 60b, 60c that can individually be connected to the compressor 48. The adsorption towers 60a, 60b, 60c are associated with respective pressure meters 62a, 62b, 62c for detecting the pressures in the adsorption towers 60a, 60b, 60c. The adsorption towers 60a, 60b, 60c have inlet/outlet ends (lower ends) connected to respective valves 66a, 66b, 66c that are connected to an off-gas discharge passage 68. The off-gas discharge passage 68 has a valve 70 and is connected to the off-gas discharging air supply passage 36.

The adsorption towers 60a, 60b, 60c have other inlet/outlet ends (upper ends) connected to respective pressure-uniformizing valves 72a, 72b, 72c and also to respective combustion gas discharging valves 74a, 74b, 74c. The adsorption towers 60a, 60b, 60c can be connected to a fuel gas passage 76 by the combustion gas discharging valves 74a, 74b, 74c. As shown in FIG. 1, the fuel gas passage 76 has an end connected through a valve 80 to a filling tank 82 of the storage assembly 16. The fuel gas passage 76 is branched into a fuel gas branch passage 84 connected to a buffer tank 88 by a valve 86 of the storage assembly 16.

The filling tank 82 supplies a fuel gas to a fuel cell vehicle (not shown). The buffer tank 88 supplies a fuel gas to a stationary fuel cell (not shown) installed in households for generating electric energy.

A residual gas supply means 90 for supplying the off gas (residual gas) in the adsorption towers 60a, 60b, 60c of the PSA mechanism 42 to the combustor 20 is disposed between the PSA mechanism 42 and the combustor 20. The residual gas supply means 90 has a residual gas passage 92 (part of the off-gas discharging air supply passage 36) connected to the PSA mechanism 42 and the combustor 20, and a branch passage 94 having opposite ends connected to the residual gas passage 92 and branched from the residual gas passage 92.

The residual gas passage 92 has an opening-adjustable valve (flow rate adjusting mechanism) 96 positioned between the connected opposite ends of the branch passage 94 and having an adjustable opening. The branch passage 94 has a check valve 98, a chamber 100 for storing an off gas therein, and an on-off valve (valve) 102 arranged successively along the direction in which the residual gas flows through the branch passage 94.

The home fuel gas refining system 10 has a control ECU (Electronic Control unit) 104 as a control means for communicating with various accessory units and controlling various components of the home fuel gas refining system 10, and also controlling at least the residual gas supply means 90 according to the first embodiment.

Operation of the home fuel gas refining system 10 thus constructed will be described below.

In the home fuel gas refining system 10, the air compressor 30 is operated by the control ECU 104 to deliver modifying air and off-gas discharging air respectively to the modifying-air supply passage 32 and the off-gas discharging air supply passage 36.

The modifying air that is delivered to the modifying-air supply passage 32 is supplied to the evaporator 18, which is also supplied with a modification fuel such as a compressed natural gas (CNG) or the like and water. The combustor 20 is supplied with the combusting air, an off gas, and, if necessary, hydrogen, a burning process is carried out, enabling the evaporator 18 to evaporate the modification fuel and water.

The evaporated modification fuel is sent from the evaporator 18 to the reactor 22. The reactor 22 simultaneously performs an oxidizing reaction represented by $CH_4 + 2O_2 \rightarrow CO_2 + 2H_2O$ (exothermic reaction) and a fuel modifying reaction represented by $CH_4 + 2H_2O \rightarrow CO_2 + 4H_2$ (endothermic reaction) on methane, for example, in the modification fuel, oxygen in the air, and water vapor (automatic thermal process).

The modified gas that is produced by the reactor 22 is cooled by the cooler 24 and then supplied to the gas-liquid separator 26, which separates water from the modified gas. The modified gas is then sent from the gas-liquid separator 26 to the modified gas supply passage 40. The modified gas is compressed by the compressor 48 and selectively supplied to the adsorption towers 60a, 60b, 60c of the PSA mechanism 42 (see FIG. 2).

Figure 3:
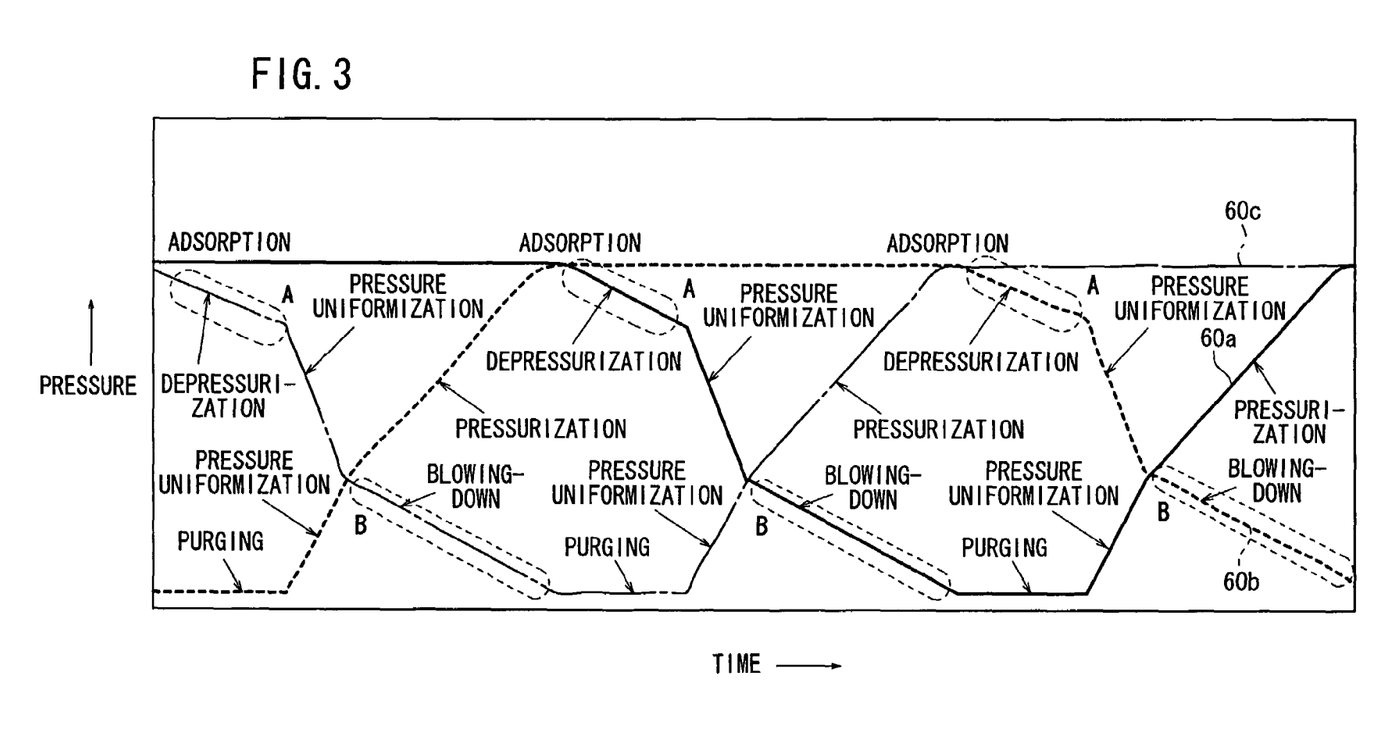
FIG. 3 is a timing chart illustrative of the manner in which the PSA mechanism operates.

As shown in FIG. 3, the adsorption tower 60a performs an adsorption process, the adsorption tower 60b performs a purging process, and the adsorption tower 60c performs a depressurization process, for example, simultaneously. Specifically, the adsorption tower 60a adsorbs components other than hydrogen of the modified gas, thus producing a fuel gas containing high-concentration hydrogen (hydrogen-rich). The valve 74a is then opened to supply the fuel gas from the adsorption tower 60a to the fuel gas passage 76 (see FIG. 2). The fuel gas is then selectively stored in the filling tank 82 and the buffer tank 88 as shown in FIG. 1.

Then, as shown in FIG. 3, the adsorption tower 60a performs an adsorption process, the adsorption tower 60b performs a pressure uniformization process, and the adsorption tower 60c performs a pressure uniformization process. Thereafter, the adsorption tower 60a performs an adsorption process, the adsorption tower 60b performs a pressurization process, and the adsorption tower 60c performs a blowing-down process. When the valve 66c is opened, an off gas (residual gas) produced by the blowing-down process in the adsorption tower 60c is discharged into the off-gas discharge passage 68.

As shown in FIG. 1, the off-gas discharge passage 68 is connected to part of the off-gas discharging air supply passage 36, i.e., the residual gas passage 92. The off gas that is discharged into the off-gas discharge passage 68 is delivered to the combustor 20 by the off-gas discharging air which flows through the residual gas passage 92. The off gas is used as a combustion fuel by the combustor 20.

The adsorption towers 60a, 60b, 60c thus successively perform the adsorption, depressurization, pressure uniformization, blowing-down (desorption), and purging processes to enable the PSA mechanism 42 to refine the fuel gas continuously. The fuel gas is supplied from the fuel gas passage 76 to the storage assembly 16 when the valves 74a, 74b, 74c are selectively opened and closed.

As shown in FIG. 3, when the adsorption towers 60a, 60b, 60c perform the above processes successively, they discharge an off gas at different times in the cleaning process A and the desorption process B. The cleaning process A is essentially a depressurization process, and the desorption process B is essentially a blowing-down process.

In each of the cleaning process A and the desorption process B, the pressure in each of the adsorption towers 60a, 60b, 60c decreases as the off gas is discharged. The flow rate of the off gas is maximum in an initial discharging phase of each process, and then gradually decreases as the process proceeds. In a final phase of each of the depressurization process and the blowing-down process, almost no off gas is discharged. No off gas is discharged in the pressure uniformization process.

Figure 4:
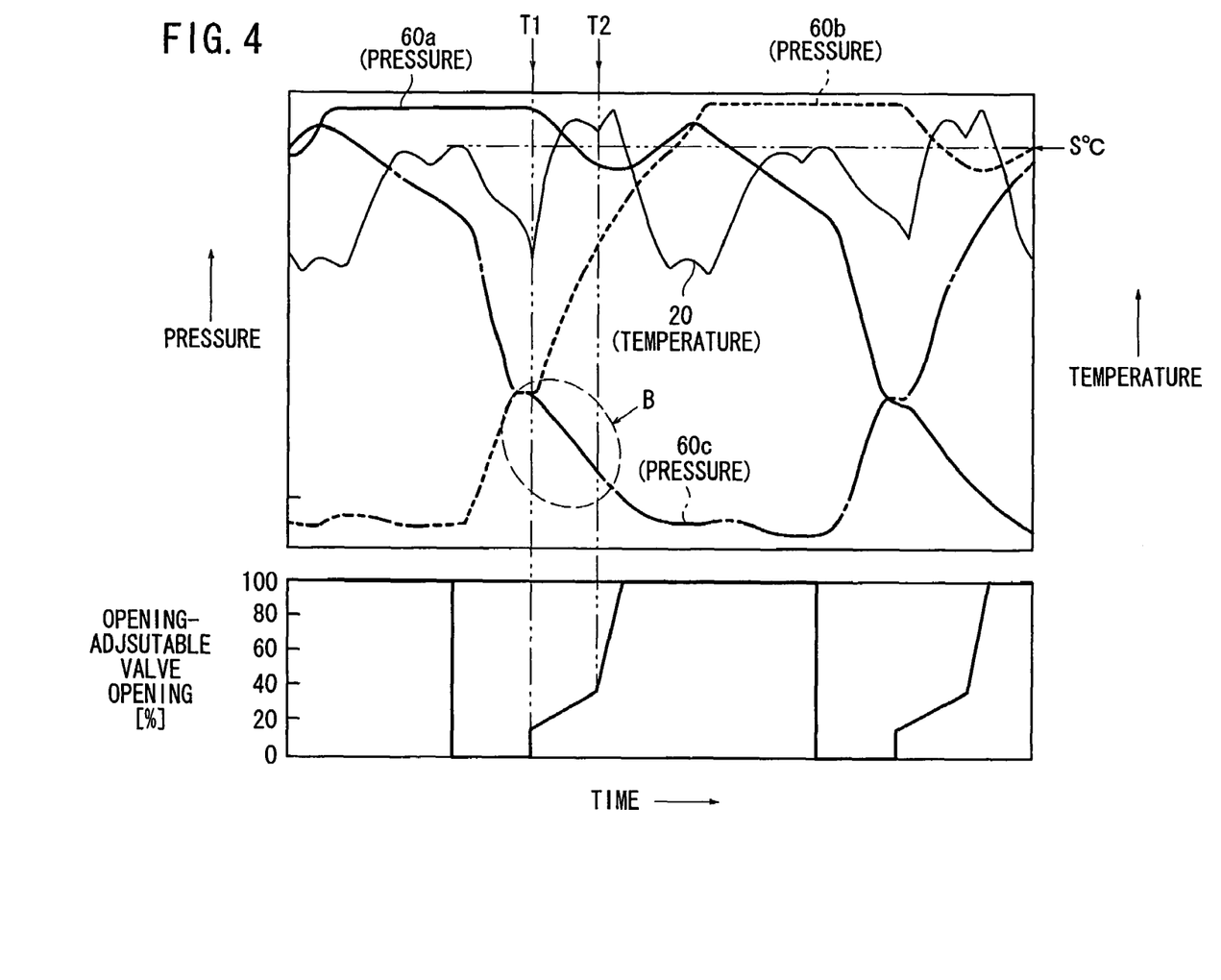
FIG. 4 is a timing chart illustrative of a control process of only an opening-adjustable valve.

If only the opening-adjustable valve 96 is controlled to regulate the pressures in the adsorption towers 60a, 60b, 60c without employing the chamber 100 shown in FIG. 1, then the pressures in the adsorption towers 60a, 60b, 60c and the temperature of the combustor 20 are varied as shown in FIG. 4. Specifically, the opening of the opening-adjustable valve 96 is set to a low level, e.g., 15%, at a desorption (blowing-down) starting point T1 of the adsorption tower 60c, and then gradually increased. At a point T2 where the combustion temperature of the combustor 20 exceeds a peak level, the opening of the opening-adjustable valve 96 is increased at a higher rate, and then kept at a maximum level (100%).

However, if only the opening of the opening-adjustable valve 96 is adjusted, the maximum temperature of the combustor 20 exceeds an abnormal temperature S° C. At the desorption starting point T1, the calorific amount of the off gas charged into the combustor 20 is not lowered, the thermal load on the combustor 20 is increased even if the opening of the opening-adjustable valve 96 is set to a low level.

Figure 5:
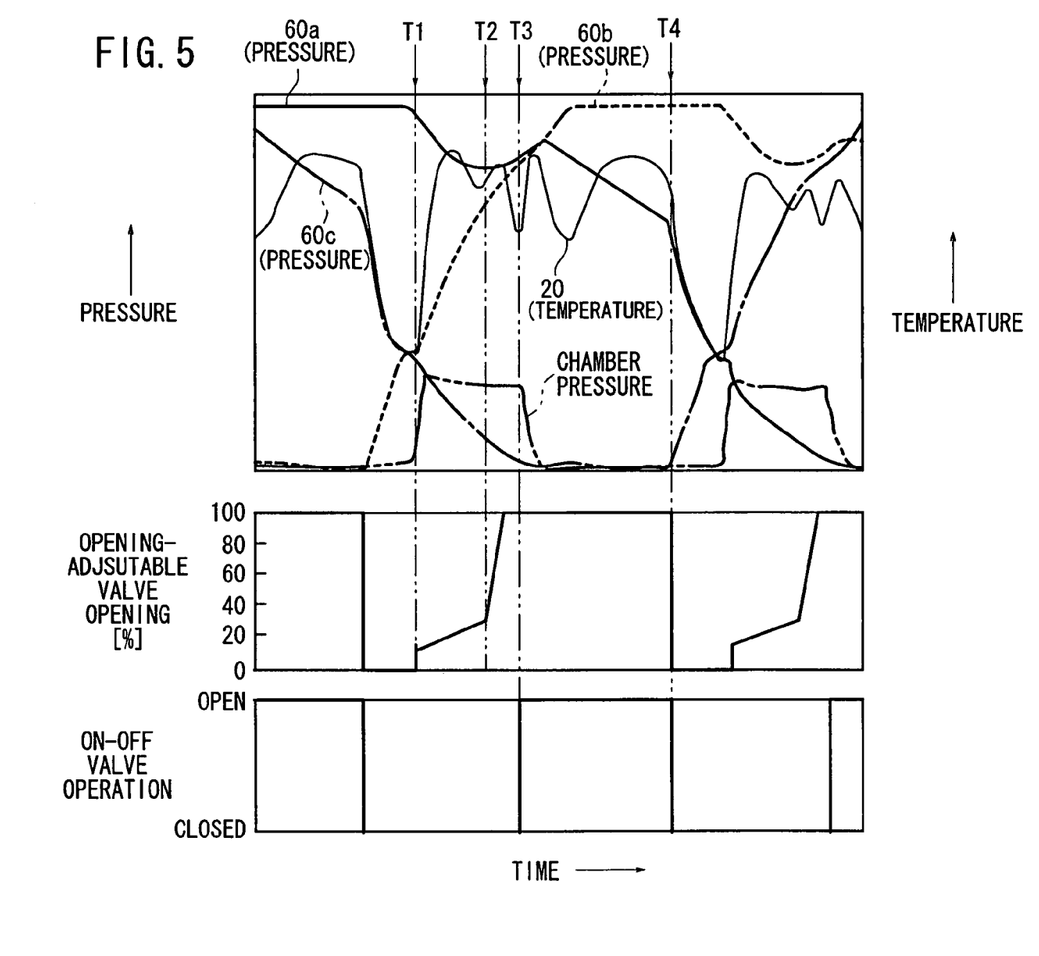
FIG. 5 is a timing chart illustrative of the control process of the opening-adjustable valve and a single cycle of operation of an on-off valve.

According to the first embodiment, the branch passage 94 is branched from the residual gas passage 92, and the chamber 100 and the on-off valve 102 are disposed in the branch passage 94. Furthermore, both the opening-adjustable valve 96 and the on-off valve 102 are controlled as shown in FIG. 5.

Specifically, at the desorption starting point T1 of the adsorption tower 60b, the opening of the opening-adjustable valve 96 is set to a low level, and the on-off valve 102 is closed. Therefore, since the off gas discharged from the adsorption tower 60c is partly introduced from the branch passage 94 into the chamber 100, the maximum calorific amount charged into the combustor 20 is reduced for only the remainder of the off gas is burned. Therefore, the thermal load on the combustor 20 is effectively reduced.

The opening-adjustable valve 96 is gradually increased to the point T2 where the combustion temperature of the combustor 20 exceeds a peak level. At the point T2, the opening of the opening-adjustable valve 96 is increased at a higher rate. At a point T3 where the combustion temperature of the combustor 20 exceeds another peak level, the on-off valve 102 is opened to allow the off gas that has been stored in the chamber 100 at the desorption starting point T1 to be charged into the combustor 20.

While the discharge of the off gas from the PSA mechanism 42 is being stopped, the off gas stored in the chamber 100 is supplied to the combustor 20, effectively preventing the temperature of the combustor 20 from dropping. The on-off valve 102 may be closed at a time when the volume of the chamber 100 can be used most effectively, e.g., a point T4 where the pressure in the adsorption tower 60c is reduced to the lowest level.

According to the first embodiment, therefore, when the off gas is discharged from the PSA mechanism 42, i.e., when the cleaning process or the desorption process begins, the on-off valve 102 is closed to store part of the off gas in the chamber 100. Therefore, the calorific amount of the off gas charged into the combustor 20 is prevented from becoming greater than necessary.

While the off gas is not being discharged from the PSA mechanism 42, i.e., in the pressure uniformization process of each of the adsorption towers 60a, 60b, 60c, the on-off valve 102 is opened to supply the off gas stored in the chamber 100 to the combustor 20. Therefore, the calorific amount of the off gas charged into the combustor 20 is prevented from being unduly lowered, preventing the temperature of the combustor 20 from being lower than necessary.

According to the first embodiment, therefore, the home fuel gas refining system 10 does not need a large-capacity off-gas tank and hence may be small in overall size. Furthermore, the maximum temperature of the combustor 20 can be lowered, and the repetition of heating and cooling thereof through a large temperature change can be reduced, so that heat can stably be supplied to the modifier 12.

According to the control pattern shown in FIG. 5, the off gas stored in the chamber 100 is discharged in a single cycle of operation of the on-off valve 102. However, as shown in FIG. 6, the on-off valve 102 may be operated, i.e., opened and closed, in several cycles, e.g., two cycles, to discharge the off gas stored in the chamber 100 in two stages.

Figure 6:
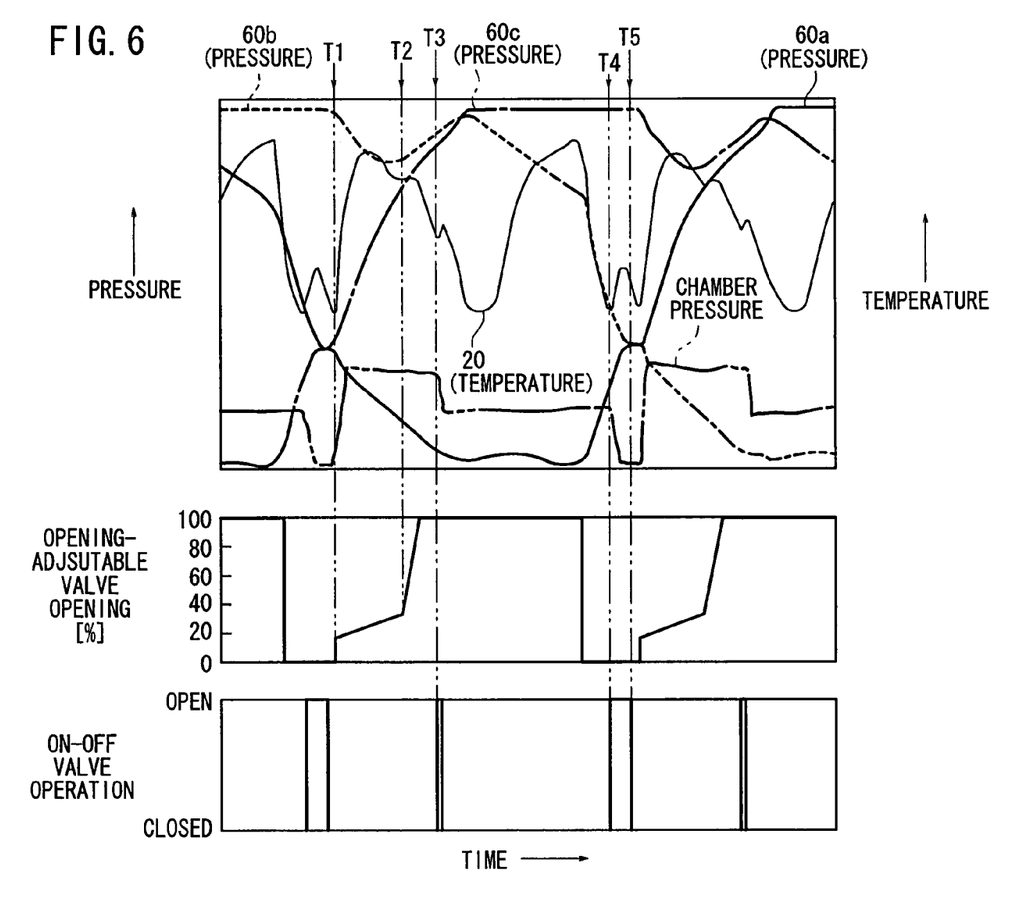
FIG. 6 is a timing chart illustrative of the control process of the opening-adjustable valve and two cycles of operation of the on-off valve.

According to the control pattern shown in FIG. 6, after the off gas is discharged from the chamber 100 in the first stage at a point T3, the off gas is discharged from the chamber 100 in the second stage at a point T4 where the combustion temperature of the combustor 20 is lowered. In this manner, the combustion temperature of the combustor 20 is prevented from being unduly lowered at the point T4.

The ratio between the amount of the off gas discharged from the chamber 100 in the first stage and the amount of the off gas discharged from the chamber 100 in the second stage may be adjusted. Consequently, the lowest temperatures of the combustor 20 after the desorption process and the cleaning process may be equalized, and the maximum temperature of the combustor 20 may be set to a low level.

Therefore, heat can stably be supplied to the modifier 12 without impairing the capability of the PSA mechanism 42, and the change in the temperature of the combustor 20 while in operation can be reduced to lower the thermal load on the combustor 20.

Figure 7:
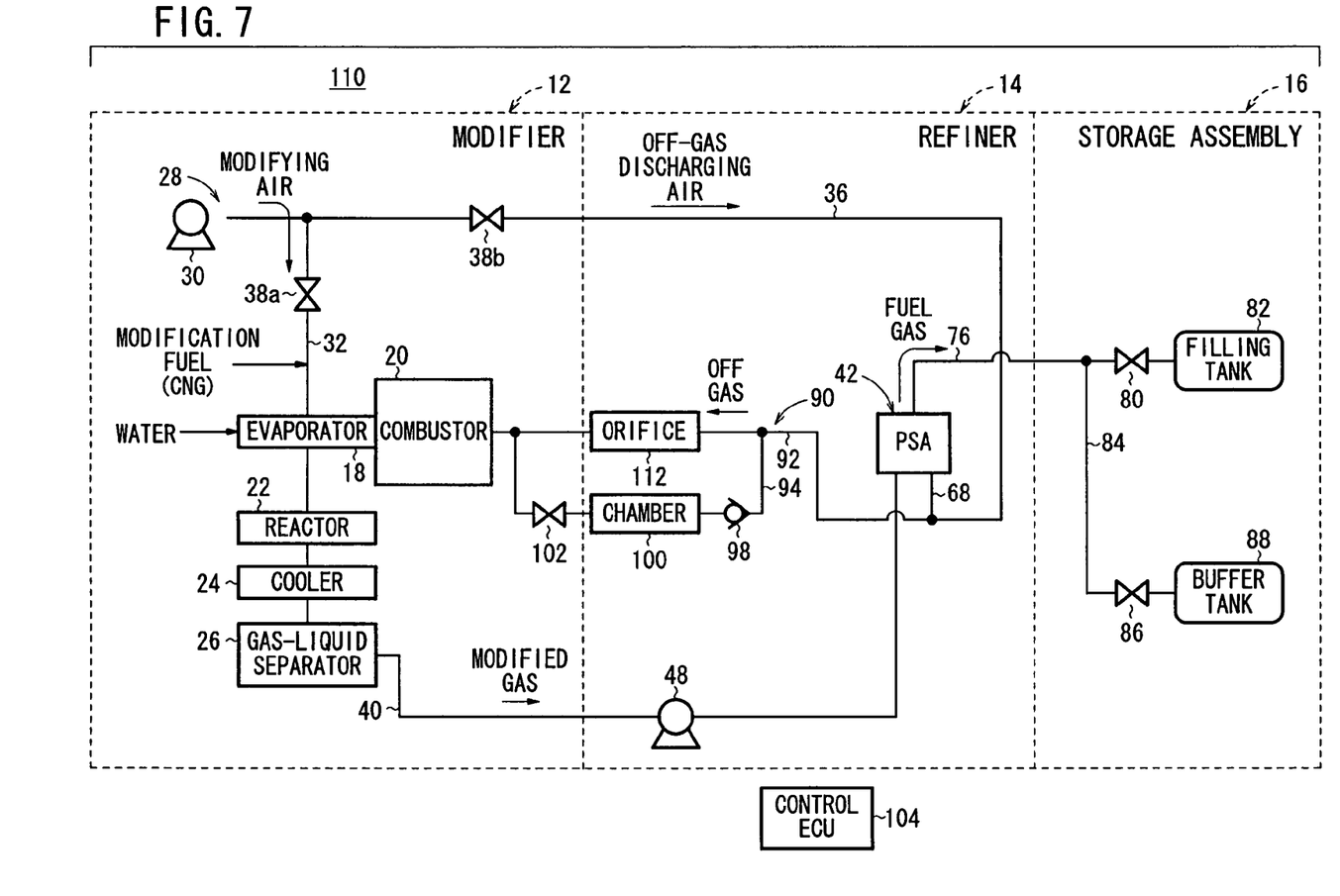
FIG. 7 is a block diagram of a home fuel gas refining system as a fuel gas manufacturing apparatus according to a second embodiment of the present invention.

FIG. 7 shows in block form a home fuel gas refining system (fuel gas refining system for household use) 110 as a fuel gas manufacturing apparatus according to a second embodiment of the present invention. The constituent elements that are identical to those of the home fuel gas refining system 10 according to the first embodiment are labeled with the same reference numeral, and description thereof will be omitted.

The home fuel gas refining system 110 has an orifice (flow rate adjusting mechanism) 112 instead of the opening-adjustable valve 96. Therefore, by adjusting the throttling amount of the orifice 112, the same effects can be obtained as with the opening-adjustable valve 96 described above.

In the first and second embodiments, the PSA mechanism 42 is of a three-tower structure having the adsorption towers 60a, 60b, 60c. However, the principles of the present invention are also applicable to PSA mechanisms of other designs, e.g., a PSA mechanism having four adsorption towers.

Although certain preferred embodiments of the present invention have been shown and described in detail, it should be understood that various changes and modifications may be made therein without departing from the scope of the appended claims.

What is claimed is:

1. An apparatus for manufacturing a fuel gas, comprising:
    a modifier for modifying a hydrogen-containing fuel to produce a modified gas;
    a refiner including a PSA mechanism for removing unwanted materials from said modified gas to refine a hydrogen-rich fuel gas; and
    residual gas supply means for supplying a residual gas from a tower of said PSA mechanism to a heater;
    said residual gas supply means comprising:
        a residual gas passage connected to said PSA mechanism and said heater; and
        a branch passage having opposite ends connected to said residual gas passage and branched from said residual gas passage;
        said branch passage having a chamber for storing the residual gas.

2. An apparatus according to claim 1, wherein said apparatus further comprises a storage assembly for storing said hydrogen-rich fuel gas.

3. An apparatus according to claim 1, wherein said residual gas passage has a flow rate adjusting mechanism positioned between the connected opposite ends of said branch passage; and
    wherein in said branch passage, said chamber and a valve and are successively arranged along a direction in which the residual gas flows through said branch passage.

4. An apparatus according to claim 3, wherein said valve comprises an on-off valve, said apparatus further comprising:
    control means for controlling at least said residual gas supply means to open and close said on-off valve at least twice to discharge the residual gas stored in said chamber in stages.

5. An apparatus according to claim 3, wherein said flow rate adjusting mechanism comprises an opening-adjustable valve.

6. An apparatus according to claim 1, wherein said modifier comprises:
    an evaporator for evaporating said hydrogen-containing fuel;
    said heater comprising a combustor combined with said evaporator.

7. A method of operating an apparatus for manufacturing a fuel gas, said apparatus comprising a modifier for modifying a hydrogen-containing fuel to produce a modified gas, a refiner including a PSA mechanism for removing unwanted materials from said modified gas to refine a hydrogen-rich fuel gas, and residual gas supply means for supplying a residual gas from a tower of said PSA mechanism to a heater, said residual gas supply means comprising a residual gas passage connected to said PSA mechanism and said heater and having a flow rate adjusting mechanism, and a branch passage branched from said residual gas passage and having a chamber for storing the residual gas and a valve, said method comprising the steps of:
    when the residual gas is discharged from said PSA mechanism, closing said valve to store part of the residual gas in said chamber and opening said flow rate adjusting mechanism to supply the remainder of the residual gas to said heater; and
    when the residual gas is not discharged from said PSA mechanism, opening said valve to supply the residual gas stored in said chamber to said heater.

8. A method according to claim 7, wherein said valve comprises an on-off valve, and said on-off valve is opened and closed at least twice to discharge the residual gas stored in said chamber in stages.

9. A method according to claim 7, wherein said flow rate adjusting mechanism comprises an opening-adjustable valve.

10. A method according to claim 7, wherein said modifier comprises an evaporator for evaporating said hydrogen-containing fuel, said heater comprising a combustor combined with said evaporator.

* * * * *